United States Patent [19]

Baldi

[11] 4,308,160

[45] Dec. 29, 1981

[54] PROTECTING METALS

[75] Inventor: Alfonso L. Baldi, Wynnewood, Pa.

[73] Assignee: Alloy Surfaces Company, Inc., Wilmington, Del.

[21] Appl. No.: 809,189

[22] Filed: Jun. 23, 1977

Related U.S. Application Data

[63] Continuation-in-part of Ser. No. 752,855, Dec. 21, 1976, and a continuation-in-part of Ser. No. 694,951, Jun. 11, 1976, abandoned, and a continuation-in-part of Ser. No. 614,834, Sep. 19, 1975, Pat. No. 4,141,760, each is a continuation-in-part of Ser. No. 579,945, May 22, 1975, abandoned, said Ser. No. 614,834, and Ser. No. 579,945, each is a continuation-in-part of Ser. No. 466,908, May 3, 1978, Pat. No. 3,958,047, and a continuation-in-part of Ser. No. 446,473, Feb. 27, 1974, Pat. No. 3,958,046, and a continuation-in-part of Ser. No. 404,665, Oct. 9, 1973, Pat. No. 3,948,689, and a continuation-in-part of Ser. No. 357,616, May 7, 1973, Pat. No. 3,948,687, and a continuation-in-part of Ser. No. 304,220, Nov. 6, 1972, Pat. No. 3,936,539, said Ser. No. 446,473, is a continuation-in-part of Ser. No. 219,514, Jan. 20, 1972, Pat. No. 3,801,357, said Ser. No. 404,665, and Ser. No. 357,616, and Ser. No. 304,222, each is a continuation-in-part of Ser. No. 219,514, , and a continuation-in-part of Ser. No. 254,403, May 18, 1972, Pat. No. 3,785,854, and a continuation-in-part of Ser. No. 90,682, Nov. 18, 1970, Pat. No. 3,764,371, said Ser. No. 254,403, and Ser. No. 90,682, each is a continuation-in-part of Ser. No. 219,514, , said Ser. No. 90,682, and Ser. No. 219,514, each is a continuation-in-part of Ser. No. 837,811, Jun. 30, 1969, abandoned.

[51] Int. Cl.$^3$ .............................................. H01J 7/18
[52] U.S. Cl. ................................ 252/181.2; 427/252; 427/253
[58] Field of Search ........................ 427/253, 250, 252; 252/181.2; 75/252, 253, 255

[56] References Cited

U.S. PATENT DOCUMENTS

| | | | |
|---|---|---|---|
| 3,079,276 | 2/1963 | Puyear et al. | 427/253 |
| 3,096,160 | 7/1963 | Puyear | 427/253 |
| 3,096,205 | 7/1963 | Guisto et al. | 427/253 |
| 3,108,013 | 10/1963 | Chao et al. | 427/253 |
| 3,632,407 | 1/1972 | Bumgardt et al. | 427/253 |
| 3,779,719 | 12/1973 | Clark et al. | 427/253 |
| 3,958,047 | 5/1976 | Baldi | 427/252 |
| 4,126,488 | 11/1978 | Kunst et al. | 427/253 |
| 4,260,654 | 4/1981 | Baldi | 427/253 |

*Primary Examiner*—Benjamin R. Padgett
*Assistant Examiner*—J. L. Barr
*Attorney, Agent, or Firm*—Connolly and Hutz

[57] ABSTRACT

Diffusion chromizing of nickel-base superalloys is effected with essentially no formation of oxide or alpha-chrome, even in a high-volume diffusion coating pack, by use of a pack consisting essentially of, by weight, about 2 to about 3% aluminum about 3 to about 6 times as much chromium as aluminum a mixture of cobalt and nickel in a combined amount about 10 to about 20 times the amount of aluminum, the amount of cobalt being from about ½ to about 4/3 the amount of nickel the balance of the pack being essentially inert filler and activating material. The use of a magnesium halide activator with such pack extends the improvement to the application of heavier chromizing cases. Pack can be of fluent type, particularly where workpiece is partially masked, and masking can be colored to provide visual contrast. Metals not requiring chromizing can be aluminized and top coated with slurry of flake aluminum in aqueous solution of $CrO_4^=$, $PO_4^=$ and $Mg^{++}$. Gun barrels can have their internal bores diffusion chromized with fluent pack, and quenched during the cool-down that follows the chromizing.

12 Claims, No Drawings

PROTECTING METALS

This application is a continuation-in-part of applications Ser. No. 752,855 filed Dec. 21, 1976, Ser. No. 694,951 filed June 11, 1976 (subsequently abandoned) and Ser. No. 614,834 filed Sept. 19, 1975 (U.S. Pat. No. 4,141,760 granted Feb. 27, 1979), each of which is in turn a continuation-in-part of application Ser. No. 579,945 filed May 22, 1975 (subsequently abandoned). Applications Ser. Nos. 614,834 and 579,945 are also continuations-in-part of applications Ser. No. 466,908 filed May 3, 1974 (now U.S. Pat. No. 3,958,047 granted May 18, 1976), Ser. No. 446,473 filed Feb. 27, 1974 (now U.S. Pat. No. 3,958,046 granted May 18, 1976), Ser. No. 404,665 filed Oct. 9, 1973 (now U.S. Pat. No. 3,948,689 granted Apr. 6, 1976), Ser. No. 357,616 filed May 7, 1973 (now U.S. Pat. No. 3,948,687 granted Apr. 6, 1976), and Ser. No. 304,220 filed Nov. 6, 1972 (now U.S. Pat. No. 3,936,539 granted Feb. 3, 1976). Application Ser. No. 446,473 is in its turn a continuation-in-part of application Ser. No. 219,514 filed Jan. 20, 1972 (now U.S. Pat. No. 3,801,357 granted Apr. 2, 1974), while applications Ser. Nos. 404,665, 357,616 and 304,220 are each continuations-in-part of Ser. No. 219,514 as well as of applications Ser. No. 254,403 filed May 18, 1972 (now U.S. Pat. No. 3,785,854 granted Jan. 15, 1974) and Ser. No. 90,682 filed Nov. 18, 1970 (now U.S. Pat. No. 3,764,371 granted Oct. 9, 1973). Applications Ser. Nos. 254,403 and 90,682 are each in their turn continuations-in-part of Ser. No. 219,514, while applications Ser. Nos. 90,682 and 219,514 are each continuations-in-part of application Ser. No. 837,811 filed June 30, 1969 (subsequently abandoned).

The present invention relates to the protection of metals against chemical attack.

Among the objects of the present invention is the provision of novel protective coatings for metals as well as novel techniques for applying such coatings.

The foregoing as well as additional objects of the present invention are more fully expounded in the following description of several of its exemplifications.

It has been recognized that nickel-base superalloys in services such as jet engine hot section blades, can be very effectively protected against such high temperature use by a diffusion coated chromized case at least about 0.6 mil thick in which case the outermost 15% contains at least 20% chromium. However the protection provided by such a case is seriously impaired if the chromium in the case is in the alphachrome form, or if oxide inclusions are present in or adjacent the case.

The prior art describes chromizing techniques for providing the desired coatings, but these techniques have not solved all problems. The prior art coating techniques do not lend themselves to high-yield high-production operation, or in some instances they tend to form oxides in the case and/or leave a small amount of the applied chromium in the alphachrome condition.

According to the present invention the desired chromized cases are provided by chromizing the nickel-base superalloys in an activated diffusion coating pack consisting essentially of, by weight, about 2 to about 3% aluminum about 3 to about 6 times as much chromium as aluminum a mixture of cobalt and nickel in a combined amount about 10 to about 20 times the amount of aluminum, the amount of cobalt being from about ⅓ to about 4/3 the amount of nickel the balance of the pack being essentially inert filler and activating material.

Preferred pack formulations have between about 2¼ and about 2¾% aluminum, or have an amount of cobalt from about 2/5 to about ⅔ the amount of the nickel, or both.

The pack diffusion of the present invention is very effectively carried out in packed containers having volumes of about 1/70 or more cubic meters for high-production purposes, but it can also be carried out in smaller containers when high-volume production is not desired. The individual workpieces can for instance be diffusion chromized in individual retorts as described in U.S. Pat. No. 3,824,122 to facilitate the rapid cool-down generally desired for nickel-base superalloys to bring out their maximum strength.

The chromized cases produced by the packs of the present invention are generally of minimum thicknesses when the packs are activated by activators, like ammonium halides or halogen, that decompose, boil or sublime at temperatures as low as 500° F. Heavier cases are deposited when the activator includes a magnesium halide that volatilizes significantly during the diffusion coating heat. Magnesium fluoride is generally not sufficiently volatile, but the other magnesium halides are very effective when present in the coating pack in an amount at least about 0.1% by weight. This is illustrated by the following example.

EXAMPLE 1

A diffusion coating furnace as described in U.S. Pat. No. 3,764,371 is prepared with a doughnut-shaped inner retort having an outer diameter of 14½ inches, an inner diameter of 3½ inches, and a height of 6 inches. This retort is loaded with 40 B 1900 first stage jet engine blades embedded in a pack having the following formulation, by weight Cobalt: 12%
Nickel: 22.8%
Chromium: 11.6%
Aluminum: 2.6%
Alumina: balance and has been subjected to a previous firing at 1950° F. for 20 hours. Before the previous firing the pack was activated by the addition of ½% $NH_4Cl$ and ½% $MgCl_2$, based on the total weight of the other pack ingredients, and after the previous firing the pack was again activated by the same additions. All ingredients are in the form of powders whose particles range from about 10 to about 40 microns in size. The individual blades are arranged so that they are spaced from each other by at least ¼ inch of pack.

The inner retort is then loosely covered, placed in position, covered by an outer retort as described in U.S. Pat. No. 3,764,371, and subjected to a diffusion heat that brings the temperature in the inner retort to 1900°–1950° F. and holds it there for 20 hours. During the heat a slow stream of hydrogen is flowed through the interior of the outer retort and discharged to the exterior, except during the initial heating and during the final cool-down, when a stream of argon is used in place of hydrogen to displace the atmosphere within the outer retort.

The blades are then removed from the cooled-down pack, lightly blasted with fine alumina if desired, and have exceptional resistance to attack, with or without an aluminide top coating over the chromized case. Samples sectioned and inspected metallographically reveal chromized cases 0.6 to 1.2 mils thick with essentially no oxide inclusions or alphachrome, and containing the prescribed chromium content.

The pack recovered from the foregoing heat can be reused for additional such heats by merely adding fresh amounts of the activators. Both the ammonium chloride and the magnesium chloride are essentially entirely driven off during the heat. Such reused packs can be again reused upon repeating the reactivation, a total of at least five such reuses being possible.

Some of the pack metals are also consumed during the heat, particularly the chromium, and make-up of such losses enables indefinite reuse of the pack. To make it unnecessary to pre-fire the make-up metals, they can be scattered over the top of a pack before a coating heat, so that they go through their first firing out of contact with the workpieces.

The use of other activators as mentioned above, for example mixtures of iodine and magnesium bromide, or of aluminum chloride and magnesium bromide, give essentially the same results, except that some cobalt tends to appear in the coating case when iodine-containing activators are used. Such cobalt addition does not detract significantly from the effectiveness of the coating case. Omitting the magnesium halide from the activator combination causes the chromized case to be of relatively small thickness, generally not greater than about 0.6 mil, even if the heat is prolonged. On the other hand with the magnesium halide activation coating cases as thick as 1.5 mils or even thicker, can be obtained.

Reducing the amount of cobalt to less than about ¼ the amount of the nickel in the pack, permits the formation of alphachrome in the coating case. Increasing the amount of cobalt above 4/3 the amount of nickel causes significant amounts of aluminum to be deposited in the coating case. Such aluminum deposition is also caused when the amount of chromium in the pack is reduced below 3 times the amount of aluminum.

EXAMPLE 2

The process of Example 1 is repeated, but with a broken-in pack having the following composition (before activation):
Cobalt: 8%
Nickel: 26.8%
Chromium: 11.6%
Aluminum: 2.6%
Alumina: balance This heat produces an oxide-free chromized case about 0.7 mil thick, but about 0.1 mil of that case was alphachrome.

EXAMPLE 3

The process of Example 1 is again repeated, this time with the following broken-in pack:
Cobalt: 17.4%
Nickel: 17.4%
Chromium: 11.6%
Aluminum: 2.6%
Alumina: balance This heat deposits a case about 1.1 mil thick, free of oxide as well as of alphachrome.

The foregoing results are also obtained with other nickel-base superalloys, such as Udimet 700, Udimet 500, Waspaloy, Astroloy, Inconel 792, Inconel 718, IN-100, MAR-M 200, Inconel 600 and Hastelloy X, as well as when the chromizing is effected in an atmosphere that is only bathed by argon, or in a glass-sealed retort as in U.S. Pat. No. 3,037,883 where the chromizing atmosphere is autogenous.

Nickel-base superalloys that contain significant amounts of aluminum and/or titanium are particularly subject to oxide formation, as are the age-hardenable type of such superalloys. These benefit most from the foregoing type of chromizing.

The diffusion coating packs used in the foregoing chromizing can be of the fluent or non-fluent types. Ordinary packs are non-fluent; the fluent packs pour quite readily and are described in application Ser. No. 752,855. Thus about half the pack can be fluent particles that have a flow angle of about 45 degrees. This is the angle, measured from the horizontal, of the side of a cone made by pouring a stream of the particles onto one spot so as to build up a cone. Tabular alumina, which can be made by sintering alumina particles together and then crushing the sintered mass, is a very effective fluent pack ingredient, although other forms of alumina like crushed fused material and alumina-silica microspheres can also be used. The presence of silica in the pack can cause some silicon to be deposited on workpieces that have very little or no silicon content, but this does not detract significantly from the desired chromizing.

Fluent packs are very helpful when the workpiece being coated has a portion of its surface masked to prevent coating there. For such masking the shell-forming masking materials described in application Ser. No. 752,855 are highly desirable, and the fluent coating pack makes it easier to recover the masked workpiece at the completion of the coating operation with their masking intact. Little or no mechanical working of the fluent pack is needed to remove it from the retort and thus expose the masked workpieces. Thus a used fluent pack is readily removed from the interior of a narrow pipe, for instance, by pushing a narrower tube into the pipe bore and blowing air through the tube as it moves into that bore.

Fluent coating packs also do not require much tamping into place and this reduces the chances of disturbing the masking when the masked workpieces are loaded into a retort at the beginning of a coating operation.

The details of the masking arrangements are set out in application Ser. No. 752,855, and the contents of that application are incorporated in the present specification as though fully set forth herein.

The key feature of the improved masking is the application on the surface portion to be masked, of one or more layers of a masking mixture that inhibits depletion of important alloy ingredients from the substrate as a result of outward diffusion during the diffusion coating heat, and also forms a protective shell to secure the masking in place. The layer or layers are conveniently applied from a dispersion in a volatile solvent in which is dissolved a resin such as an acrylate that is driven off during the diffusion coating heat. The dispersion is very simply applied by brushing or dipping and the volatile solvent, such as methyl chloroform, permitted to evaporate off for a few seconds to set the solids.

A very effective depletion-preventing slurry is essentially a mixture in the following proportions, of
$Ni_3Al$ powder: 40 to 60 grams
Cr powder: 4 to 6 grams
alumina powder: 40 to 60 grams in 50 cc of a 5 to 10% by weight solution of poly(ethylmethacrylate) in methyl chloroform. The powders preferably have particle sizes no greater than about 50 microns, and any other inert powder, such as kaolin, can be used in place of the alumina. About 200 milligrams of non-volatiles per square centimeter are applied from a single dip or a single brushing in such a dispersion, and the dips or brushings repeated to build up the non-volatile weight to about 400 milligrams per square centimeter. This provides very good masking for the diffusion chromizing of alloys containing 10% or more chromium. For chromizing alloys containing less chromium, or for low temperature diffusion coating as with aluminum, the chromium content of the solids in the above slurry can be reduced and can be as low as 1% of all the solids.

The grey appearance of the foregoing mixtures as applied to the substrates, are sometimes difficult to visually distinguish on the substrate. Should it be desirable to make them stand out with more contrast, the mixture can be given some different color, as by substituting dark green $Cr_2O_3$ powder for some or all of the alumina. Substituting $Cr_2O_3$ for as little as one-twelfth of the alumina makes a distinct improvement in the distinguishability of the applied powder-resin layer.

Some aluminas are colored reddish and they can also be used for increasing the contrast in the appearance of the powder resin layer. If desired a little dye can be added to the dispersion for the same purpose. Where two or more different types of layers are built up to make a masking combination as described in application Ser. No. 752,855, each different type of layer can be given a different color to make them more readily distinguishable.

The cold or compressor section of jet engines have their components made of less expensive substrate materials such as stainless steels. These also require coating protection, particularly for use in marine atmospheres. An aluminized case covered by top coatings deposited from aqueous solution or dispersion has been used for this purpose, as described in U.S. Pat. No. 3,948,687.

One very effective top coating is deposited from an aqueous dispersion made by dissolving magnesium oxide or carbonate in phosphoric acid and adding chromic acid, along with fine aluminum flakes, so that the final coating mixture contains
  about 0.2 to about 0.28 mols/liter $CrO_4^{--}$,
  about 0.6 to about 0.9 mols/liter $PO_4^{---}$,
  about 0.3 to about 0.45 mols/liter $Mg^{++}$, and
  about 20 to about 40 grams/liter aluminum.

The flakes are preferably no greater than about 20 microns in maximum dimension and are dispersed in the mixture with the help of a wetting agent and a polyethylene glycol as described in U.S. Pat. No. 3,318,716 granted May 9, 1967 as well as in application Ser. No. 614,834.

Such coating mixtures do a very good job of improving the corrosion resistance of the substrate when applied, as by spraying, so as to deposit a coating that after drying weighs about 0.3 to about 2 milligrams per square centimeter, and is baked at 600° to 900° F. for at least 15 minutes, preferably 30 minutes, to render it essentially insoluble in water. The protection is indeed so effective that it does not need the preliminary porous base coating of colloidal alumina or the like as described in U.S. Pat. No. 3,948,689. The following is a typical example.

EXAMPLE 4

A solution is prepared by dissolving in 1280 grams of water:
  30 grams $CrO_3$
  21.5 grams MgO
  97.5 grams $H_3PO_4$ (100%)
after which there is added to the resulting solution
  48 grams polyethylene glycol having a molecular weight of about 300
  6.7 grams p-octyl-phenoxy-tetradecaethoxyethanol (non-ionic wetting agent)
  40.3 grams flake aluminum.

A light spray of the resulting slurry over the entire surface of a jet engine compressor section generator can, deposits a uniform layer weighing about 0.5 milligram per square centimeter after drying, and having an aluminum appearance. The coating is dried and then baked for 30 minutes at 850° F. to provide excellent protection.

The baking does not cause any significant reduction of the hexavalent chromium in the coating by the organic ingredients, nor does it cause the aluminum flakes to show signs of attack by the other ingredients. Instead there is an evolution of fumes from the coating as it heats up, indicating that organic ingredients are being driven off.

Any steel having at least about 1% chromium is very well protected by the combination of an aluminized case at least about 0.2 mil thick and the foregoing top coating. Type 3 and type 4 stainless steels including greek ascoloy and age-hardenable martensitic steels as described in U.S. Pat. No. 3,948,689 are particularly suited for such protection.

According to the present invention chromizing can also be effected to provide smooth hard low-friction surfaces on hardened steel. Thus gun barrels of high-carbon steel can have their internal bores chromized to form a hard case not over 1 mil thick that improves the operation of the barrel. Barrels having a caliber of 30 hundredths of an inch, or even less, can be improved in this way.

The pack diffusion chromizing of gun barrels is very readily accomplished with fluent packs as described in application Ser. No. 752,855. The following is an exemplification.

EXAMPLE 5

A group of 30-caliber rifle barrels made of high-carbon steel having the following formulation
  carbon: 0.7%
  silicon: 0.4%
  chromium: 0.85%
  molybdenum: 0.02%
  nickel: 0.12%
  tungsten: 0.005%
  vanadium: 0.15%
  balance essentially iron
have their bores tamped full of the following chromizing pack mixture:
  fine chromium powder (particle size 10 to 20 microns): 20%
  fluent tabular alumina granules: 80%
to which 0.5% ammonium chloride is added. Both ends of each barrel are covered with steel tabs held in place by loops of wire that encircles the barrel ends, and the barrels so filled and covered are laid in one end of a tubular diffusion coating retort such as described in U.S. Pat. No. 3,059,911 granted Oct. 23, 1962. The tubular retort has one of its ends fitted with a gas-tight wall that can be welded in place, and has its other end fitted with a readily removable plug that carries inlet and outlet lines for introducing and removing a bathing gas, and connector cable for thermocouples. The seal between the plug and the retort mouth can be fitted with an asbestos sealing gasket.

The barrels are received in the walled end of the retort, and that end is also encircled by a furnace. The plugged mouth of the retort projects from the furnace so as to make it easier to remove the plug when desired. There is no need to revolve the retort around its longitudinal axis as illustrated in U.S. Pat. No. 3,059,911, nor of embedding the barrels in a powder pack.

The furnace is started and the retort heated to bring its barrel-containing section to 1850° F. where it is held for eight hours. During the heating a slow stream of hydrogen is passed through the retort after the retort has been purged with a stream of argon.

Upon completion of the eight-hour heat the furnace is shut down, the bathing gas switched to argon, and the assembly permitted to cool. When the retort temperature reaches about 1500° F., the plug is removed and the retort tilted to slide the treated barrels into an oil quenching bath. The quenched barrels are then removed from the quenching oil, their interiors are cleaned by poking out the powder pack, rinsing and drying, and the barrels then subjected to tempering at 1250° F. for 3 hours. The resulting barrels are very hard with bright smooth hard chromium cases about 0.4 to 0.5 mil thick.

Similar results are obtained if the oil quenching is replaced by a quenching with the bathing gas, although the barrel hardness is then apt to be a little lower. Such gas quenching is made more effective by increasing the rate of flow of the quenching gas and removing the hot (1500°–1600° F.) barrel-carrying retort from the furnace, as well as by spraying the removed retort with water or immersing it in water. Inasmuch as there is no packing between the barrels and the retort when using this technique, the hot barrels are very rapidly cooled through the quenching range by any of these cooling aids, and particularly if two or three of them are combined.

In this modification the barrels can be suspended in an outer retort, as by fitting them through the openings of a perforated plate supported near the top of the retort. Projections near one end of the barrels keep the barrels from falling through the openings.

Where the quenching is completed without removing the barrels from the retort, the tempering can conveniently also be effected before removing the barrels. The bathing gas flow through the retort then continues to keep a protective atmosphere around the barrels. Alternatively a conventional tempering furnace can be used, or the retort can be reloaded with barrels that have been removed and quenched, and the reloaded retort subjected to a tempering heat cycle.

Obviously many modifications and variations of the present invention are possible in the light of the above teachings. It is, therefore, to be understood that within the scope of the appended claims the invention may be practiced otherwise than as specifically described.

The chromized barrel case improves the life of the barrel and its smoothness reduces heating by the friction of a fired projectile moving through it. The presence of substantial amounts of carbon in the steel from which the barrels are made, generally prevents alphachrome from forming, but it is not detrimental to the barrels even if it does form. A portion of the case thickness is added barrel wall thickness, and this increase can be compensated for by initially machining the barrel bore slightly oversize.

The foregoing chromizing can be arranged to provide desirable cases about 0.2 to about 1 mil thick on any high carbon (about 0.5% carbon) low alloy steel used in gun barrels having bores of up to about four inches. The chromium content of the diffusion coating pack can be as little as about 5% and as much as about 50% by weight and need not be absolutely pure but can be contaminated with any of the ingredients of the steel.

The diffusion coating temperature can be as high as about 1900° to 1950° F. or as low as about 1500° F., the coating proceeding at a more rapid rate at higher temperatures. The packs need no break-in heating, and can be reused after replenishing their consumed constituents, although it is no great loss to discard the once-used packs particularly if they otherwise have to be cleaned from adhering quenching oil.

What is claimed:

1. In the diffusion chromizing of a nickel-base superalloy to provide an essentially oxide-free case the outer 15% of which contains at least 20% chromium by weight and essentially none of the chromium is alphachrome, the improvement according to which the chromizing is from an activated diffusion coating pack consisting essentially of, by weight, about 2 to about 3% aluminum
about 3 to about 6 times as much chromium as aluminum
a mixture of cobalt and nickel in a combined amount about 10 to about 20 times the amount of aluminum, the amount of cobalt being from about ⅓ to about 4/3 the amount of nickel the balance of the pack being essentially inert filler and activating material.

2. The combination of claim 1 in which the activating material includes a magnesium halide that volatilizes during the chromizing.

3. The combination of claim 2 in which the activating material is essentially a mixture of ammonium and magnesium halides.

4. The combination of claim 1 in which the aluminum content of the pack is between about 2¼ and about 2¾%.

5. The combination of claim 4 in which the amount of cobalt is from about 2/5 to about ⅔ the amount of the nickel.

6. The combination of claim 1 in which the chromizing is effected in a packed container having a volume of at least about 1/70 cubic meter.

7. The combination of claim 1 in which the nickel-base superalloy is a high temperature gas turbine engine component.

8. A diffusion coating pack consisting essentially of, by weight, about 2 to about 3% aluminum
about 3 to about 6 times as much chromium as aluminum
a mixture of cobalt and nickel in a combined amount about 10 to about 20 times the amount of aluminum, the amount of cobalt being from about ⅓ to about 4/3 the amount of nickel the balance of the pack being essentially inert filler.

9. The diffusion coating pack of claim 8 in which the aluminum content is between about 2¼ and about 2¾%.

10. The diffusion coating pack of claim 9 in which the amount of cobalt is from about 2/5 to about ⅔ the amount of the nickel.

11. The diffusion coating pack of claim 8 which also contains diffusion coating activator.

12. The diffusion coating pack of claim 11 in which the activator includes a magnesium halide that volatilizes during diffusion coating.

* * * * *